United States Patent
Samuel et al.

(10) Patent No.: US 11,960,372 B2
(45) Date of Patent: Apr. 16, 2024

(54) VERIFIED CALLBACK CHAIN FOR BIOS SECURITY IN AN INFORMATION HANDLING SYSTEM

(71) Applicant: Dell Products L.P., Round Rock, TX (US)

(72) Inventors: Balasingh P. Samuel, Round Rock, TX (US); Sungsup Lee, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 112 days.

(21) Appl. No.: 17/686,651

(22) Filed: Mar. 4, 2022

(65) Prior Publication Data
US 2023/0281090 A1    Sep. 7, 2023

(51) Int. Cl.
| G06F 11/00 | (2006.01) |
| G06F 11/22 | (2006.01) |
| G06F 21/57 | (2013.01) |
| G06F 21/64 | (2013.01) |

(52) U.S. Cl.
CPC ........ G06F 11/2284 (2013.01); G06F 21/575 (2013.01); G06F 21/577 (2013.01); G06F 21/64 (2013.01)

(58) Field of Classification Search
CPC .................................................. G06F 11/2284
USPC .......................................................... 714/1–57
See application file for complete search history.

(56) References Cited

U.S. PATENT DOCUMENTS

| 9,430,646 B1* | 8/2016 | Mushtaq ................ H04L 67/02 |
| 9,558,329 B2 | 1/2017 | Tonry et al. |
| 2005/0081090 A1* | 4/2005 | Lin ...................... G06F 11/1417 714/E11.133 |
| 2006/0015646 A1* | 1/2006 | Ogilvy .................... G07F 19/20 709/238 |
| 2006/0224924 A1* | 10/2006 | Grieskamp ......... G06F 11/3672 714/38.12 |
| 2011/0191623 A1* | 8/2011 | Dennert ............ H04M 3/42153 714/E11.112 |
| 2015/0067763 A1* | 3/2015 | Dalcher ................ G06F 21/554 726/1 |
| 2015/0372980 A1* | 12/2015 | Eyada ..................... G06F 21/55 726/1 |
| 2016/0098314 A1* | 4/2016 | Talafa ................ G05B 23/0275 714/37 |
| 2017/0046151 A1* | 2/2017 | Hsu ......................... G06F 8/654 |
| 2018/0203629 A1* | 7/2018 | Poornachandran ..... G06F 21/76 |
| 2019/0146774 A1* | 5/2019 | Moore .................. H04L 41/082 717/172 |

(Continued)

Primary Examiner — Sarai E Butler
(74) Attorney, Agent, or Firm — Larson Newman, LLP

(57) ABSTRACT

An information handling system includes a memory and a processor. The memory stores a basic input/output system (BIOS). The processor monitors the BIOS for a unified extensible firmware interface (UEFI) event. In response to a detection of the UEFI event, the processor reads a preauthorized event callback order. The processor compares a callback order for the UEFI event with the preauthorized event callback order. Based on the callback order for the UEFI event not matching the preauthorized event callback order, the processor detects a potential vulnerability in the UEFI event. In response to the detected potential vulnerability in the UEFI event, the processor dispatches one or more callback functions from the preauthorized event callback order.

20 Claims, 6 Drawing Sheets

(56) References Cited

U.S. PATENT DOCUMENTS

2020/0250017 A1\* 8/2020 Samuel .................. G06F 9/542
2021/0255939 A1  8/2021 Chaiken et al.

\* cited by examiner

VERIFIED CALLBACK CHAIN FOR BIOS SECURITY IN AN INFORMATION HANDLING SYSTEM

FIELD OF THE DISCLOSURE

The present disclosure generally relates to information handling systems, and more particularly relates to a verified callback chain for basic input/output system security in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store a basic input/output system (BIOS). A processor may monitor the BIOS for a unified extensible firmware interface (UEFI) event. In response to a detection of the UEFI event, the processor may read a preauthorized event callback order. The processor may compare a callback order for the UEFI event with the preauthorized event callback order. Based on the callback order for the UEFI event not matching the preauthorized event callback order, the processor may detect a potential vulnerability in the UEFI event. In response to the detected potential vulnerability in the UEFI event, the processor may dispatch one or more callback functions from the preauthorized event callback order.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
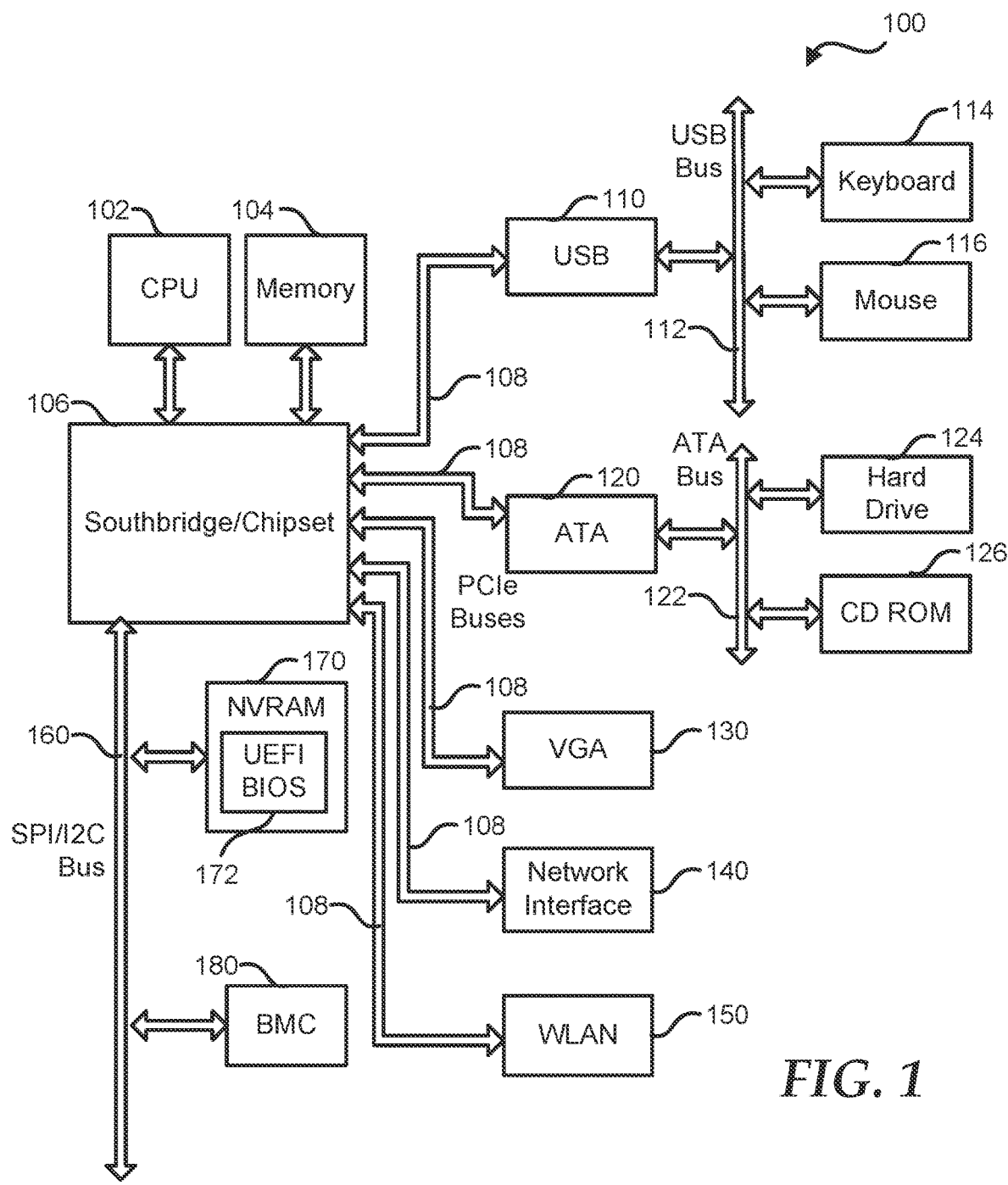
FIG. 1 is a block diagram of an information handling system according to an embodiment of the present disclosure.

FIG. 1 illustrates an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (MC) 140, a wireless local area network (WLAN) controller 150, a serial peripheral interface (SPI) bus 160, a flash memory device 170 for storing UEFI BIOS code 172, a trusted platform module (TPM) 180, and a baseboard management controller (EC) 190. EC 190 can be referred to as a service processor, and embedded controller, and the like. Flash memory device 170 can be referred to as a SPI flash device, BIOS non-volatile random access memory (NVRAM), and the like. EC 190 is configured to provide out-of-band access to devices at information handling system 100. As used herein, out-of-band access herein refers to operations performed without support of CPU 102, such as prior to execution of UEFI BIOS code 172 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems. In another embodiment, EC 190 can provide aspects of a hardware root of trust. The root of trust relates to software processes and/or hardware devices that ensure that firmware and other software necessary for operation of an information handling system is operating as expected.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

UEFI BIOS code 172 can be referred to as a firmware image, and the term BIOS is herein used interchangeably with the term firmware image, or simply firmware. In an embodiment, UEFI BIOS 172 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

UEFI BIOS code 172 includes instructions executable by CPU 102 to initialize and test the hardware components of system 100, and to load a boot loader or an operating system (OS) from a mass storage device. UEFI BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

The storage capacity of SPI flash device 170 is typically limited to 32 MB or 64 MB of data. However, original equipment manufacturers (OEMs) of information handling systems may desire to provide advanced firmware capabilities, resulting in a BIOS image that is too large to fit in SPI flash device 170. Information handling system can include other non-volatile flash memory devices, in addition to SPI flash device 170. For example, memory 104 can include non-volatile memory devices in addition to dynamic random access memory devices. Such memory is referred to herein as non-volatile dual in-line memory module (NVDIMM) devices. In addition, hard drive 124 can include non-volatile storage elements, referred to as a solid state drive (SSD). For still another example, information handling system 100 can include one or more non-volatile memory express (NVMe) devices. Techniques disclosed herein provide for storing a portion of a BIOS image at one or more non-volatile memory devices in addition to SPI flash device 170.

Figure 2:
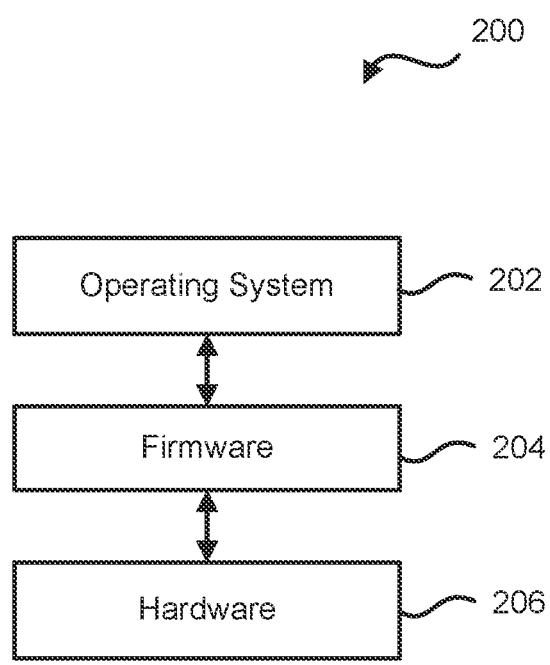
FIG. 2 is a block diagram of a high-level software architecture for an information handling system according to at least one embodiment of the present disclosure.

FIG. 2 shows a block diagram of a high-level software architecture 200 that illustrates aspects of UEFI that may be utilized in some embodiments, and implemented within information handling system 100. High-level software architecture 200 includes an operating system 202, firmware 204, and hardware 206. Firmware 204 includes program code configured to provide an interface between operating system 202 and hardware 206, and further defines device drivers and software processes that define how each device can be accessed. For example, firmware 204 can include a device driver that provides a programmatic interface to network interface device 140. Firmware 204 can be executed as defined by the UEFI specification to provide platform initialization of information handling system 100, installation of operating system 202, and other activities described below.

Figure 3:
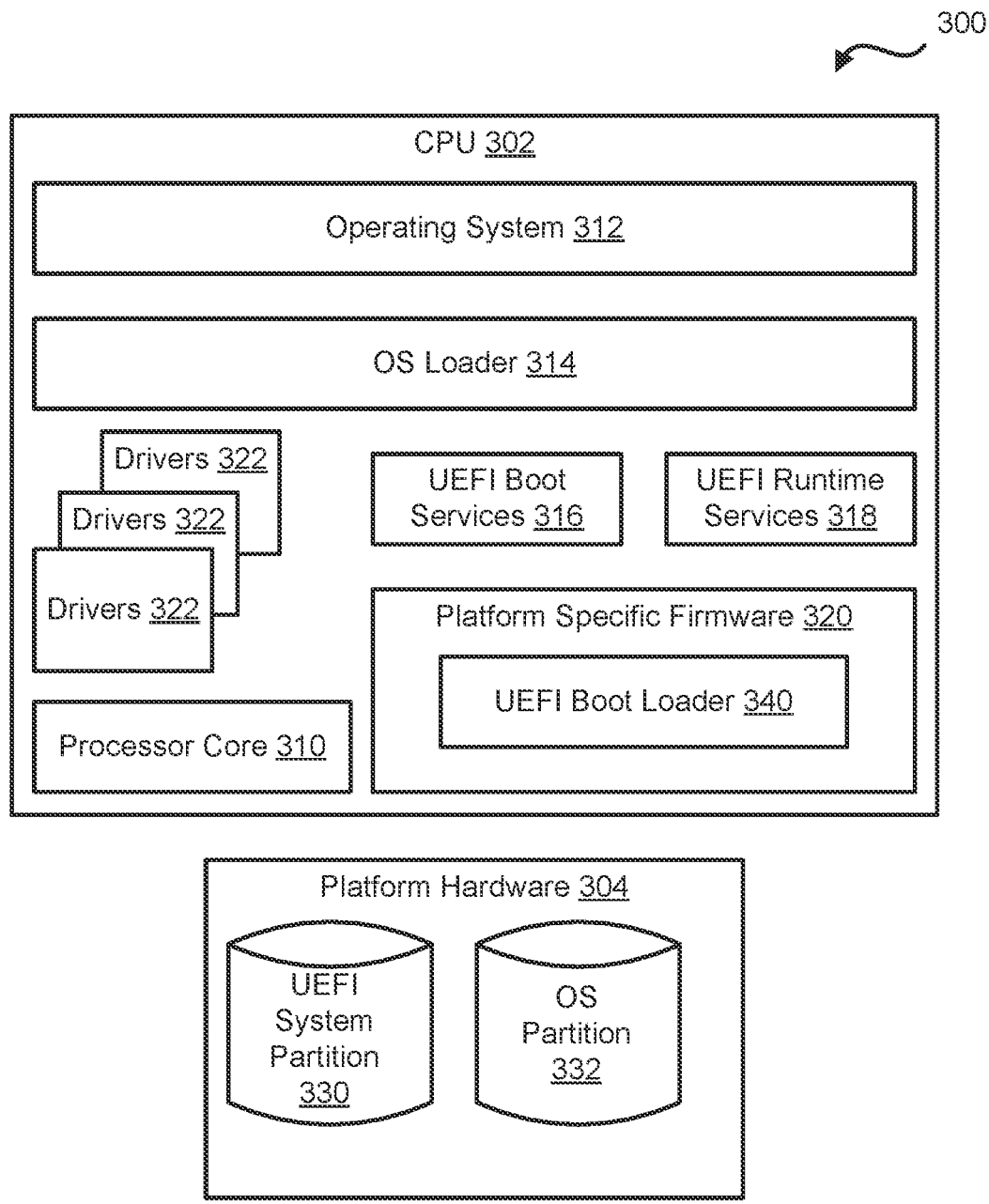
FIG. 3 is a block diagram of a portion of an information handling system according to at least one embodiment of the present disclosure.

FIG. 3 shows a portion of an information handling system 300 including aspects of UEFI BIOS 172 of FIG. 1 and firmware 204 of FIG. 2. Information handling system 300 includes a central processing unit 302, and platform hardware 304. In an embodiment, information handling system 300 can be a server, a personal computer, a laptop computer, or the like, such as or substantially similar to information handling system 100 of FIG. 1. CPU 316 includes a processor core 310, an OS 312, an OS loader 314, UEFI boot services 316, UEFI runtime services 318, platform specific firmware 320, and drivers 322. Platform hardware 304 includes a UEFI system partition 330, and an OS partition 332. Platform specific firmware 320 includes an UEFI boot loader 340. In an embodiment, information handling system 300 may include additional or fewer components, not shown in or discussed with reference to FIG. 3, without varying from the scope of this disclosure.

In an example, platform firmware 320 may retrieve OS program code from UEFI system partition 330 using OS loader 314, also known as a boot loader or OS boot loader. OS loader 314 may retrieve OS program code from other locations, including from attached peripherals or from firmware 204, itself. OS partition 332 may also be present. Once started, OS loader 314 continues to boot OS 312. OS loader 314 may use UEFI boot services 316 to support drivers 322. UEFI boot services 316 provide interfaces for devices and system functionality that can be used during boot time. UEFI runtime services 318 are available to OS loader 314 during the boot phase and to OS 312 when running. For example, runtime services 318 may be present to ensure appropriate abstraction of base platform hardware resources that may be needed by OS 312 during normal operation.

UEFI allows extension of platform firmware by loading UEFI drivers and UEFI application images which, when loaded, have access to UEFI runtime and boot services. Various program modules provide the boot and runtime services. These program modules may be loaded by boot loader 340 at system boot time. EFI boot loader 340 is a component in the UEFI firmware that determines which program modules should be explicitly loaded and when. Once the UEFI firmware is initialized, it passes control to boot loader 340. Boot loader 340 is then responsible for determining which program modules to load and in which order.

UEFI images can include BIOS drivers 322, applications, and boot loaders, and are a class of files defined by UEFI that contain executable code. UEFI boot loader 340, and a boot manager in particular, is a firmware policy engine that is in charge of loading the operating system loader and all necessary drivers. UEFI applications can be loaded by the boot manager or by other UEFI applications to accomplish platform specific tasks within the boot services environment. A BIOS driver 322 is a module of code typically inserted into firmware via protocols interfaces. BIOS drivers 322 can be loaded by the boot manager, firmware conforming to the UEFI specification, or by other UEFI applications. Each UEFI image includes one or more BIOS drivers 322.

Within a particular BIOS image, BIOS drivers 322 register their callback functions to an UEFI event in order to schedule their functions to run after certain BIOS tasks/activities have been completed. The UEFI event is signaled when activity or task is completed. In certain examples, the callback functions, such as a specific interface function, may get called once the UEFI event is signaled. In previous information handling systems, a BIOS may not have a mechanism that can verify whether the order or the integrity of event callbacks have been tampered. In these situations, malicious code may potentially alter the callback order, remove an event callback function, or the like. For example, the malicious code may skip an important security authentication/verification code callback function. Additionally, malicious code may add a new unauthorized callback function with a globally unique identifier (GUID) using buffer overflow attack or tampering attack. In certain examples, once BIOS is compromised, the vulnerability will stick with the BIOS as it is persistent and undetectable. As described herein, information handling system 300 may be improved by verifying event callback chains derived from runtime pre-boot operations with an exact expected, or pre-authorized, chain of event callbacks. In an example, the pre-authorized chain of event callbacks may be generated during a build time of the BIOS. As used herein, event callback, event callback order, callback chain, or the like may be used interchangeably to identify the same term or sequence of callbacks during BIOS runtime operations.

During a build process for a particular BIOS, processor 310 may create one or more callback chains. In certain examples, a specific tagged BIOS is utilized for a specific platform. In this situation, every compilation should result in the same identical BIOS image with identical BIOS behavior. In turn, each specific BIOS must have a fixed callback chain for each EFI event. In an example, processor 310 may generate multiple callback chains as may be required based on information handling system 300 may boot to multiple destinations or platforms, such as host OS, service OS, setup page, BIOS update, pre-boot diagnostics, or the like. As used herein, operations described for execution by processor 310 may be performed by the processor while executing the BIOS firmware in information handling system 300.

In certain examples, processor 310 or other component may generate an event callback order in any suitable manner. For example, processor 310 may generate the event callback order based on a fixed or static file within the information handling system 300. In an example, when the callback order generated based on a static file, processor 310 may statically analyze complied code that includes multiple drivers 322 and each driver may register a different event callback. In this situation, processor 310 may track in order what driver 322 has registered what event on a driver by driver basis. In another example, processor 310 may generate the event callback order using a power on self-test (POST) build tool. If the event callback order is generated using a POST build tool, processor 310 may utilize the POST build tool to automatically build a callback chain based on a UEFI dependency expression and event objects. For example, processor 310 may run the BIOS in a controlled or safe environment and the processor may observe the different drivers 322 that run different callback events to create the callback chain. In certain examples, a particular model BIOS is used for a particular platform, such that each platform has its own BIOS and callback chain.

In response to the callback order being generated, the callback order may be signed by any suitable component. For example, the callback order may be sent to a hardware security module (HSM) server, which in turn may sign the callback order for verification purposes during BIOS runtime. The HSM server may provide the signed callback order to the processor.

In response to receiving the signed callback order, the processor may define the signed callback order as a pre-authorized callback order. In an example, the BIOS may be generated with the pre-authorized callback order as part of the BIOS. The generated BIOS may be saved in a memory of the information handling system 300. In an example, the BIOS may be flashed into the memory, or a BIOS already stored in the memory may be updated with the generated BIOS having the pre-authorized callback order. In certain examples, the pre-authorized callback chains within a BIOS may be securely provisioned to an un-mutable storage space within a serial peripheral interface (SPI) flash memory. In an example, this un-mutable storage space within the SPI flash memory may protect the integrity of the pre-authorized callback chains. In this situation, the pre-authorized callback chains may only be updated during a secure BIOS update process.

As stated above, different callback chains may be utilized based on particular boot destinations, such as host OS, service OS, boot to diagnostics, boot to setup, or the like. Based on different callback chains being created during the BIOS runtime for different boot destinations, processor 310 may generate different pre-authorized callback chains for the different boot destinations. For example, if the boot destination is to a host OS, processor 310 may generate any suitable number of pre-authorized callback chains, such as a ready to boot callback chain, an exit boot services callback chain, or any other callback chain. In an example, the pre-authorized ready to boot callback chain may include any suitable sequence of callbacks and each callback may have its own GUID. Each callback function may include a GUID, which is a 128-bit value used to differentiate services and structures in the boot services environment.

In an example, within a boot to host OS destination, a first pre-authorized callback chain may be a ready to boot callback chain. The pre-authorized callback order for the ready to boot callback chain may include callback GUID 123ABC00→callback GUID 754A0BD0→callback GUID FAD543B12→callback GUID ABC00E749. In an example, the pre-authorized callback chain for exit boot services within the boot to host OS destination may include callback GUID E476DA78→callback GUID A267BC90→callback GUID DC584F41→callback GUID DA4F4857→callback GUID BA018C57.

In certain examples, the boot to service OS destination may include the same general pre-authorized callback chain but with slightly different callback GUIDs than the pre-authorized callback chains within the boot to host OS destination. For example, the pre-authorized ready to boot callback chain within the boot to service OS destination may include callback GUID 123ABC00→callback GUID 754A0BD0→callback GUID FAD543B12→callback GUID ABC00E749→callback GUID A12B57E7. Thus, the difference in the pre-authorized ready to boot callback chain in the boot to service OS destination may include the same callback GUIDs with an added callback GUID at the end of the pre-authorized callback chain as compared to the pre-authorized ready to boot callback chain in the boot to host OS destination. Additionally, the pre-authorized callback chain for exit boot services within the boot to service OS destination may include callback GUID E476DA78→callback GUID A267BC90→callback GUID DC584F41→callback GUID DA4F4857→callback GUID BA018C57. In this example, the pre-authorized callback chain for exit boot services may be substantially similar for both the boot to host OS destination and the boot to service OS destination.

In an example, the boot to diagnostics destination may include the same general pre-authorized callback chain but with slightly different callback GUIDs than the pre-authorized callback chains within the boot to host OS destination and the boot to service OS destination. For example, the pre-authorized ready to boot callback chain within the boot to service OS destination may include callback GUID 123ABC00→callback GUID 754A0BD0→callback GUID FAD543B12→callback GUID A12B57E7. Thus, the difference in the pre-authorized ready to boot callback chain in the boot to service OS destination may include the substantially similar callback GUIDs with the fourth callback GUID ABC00E749 removed from the pre-authorized callback chain as compared to the pre-authorized ready to boot callback chain in the boot to service OS destination. Additionally, the pre-authorized callback chain for exit boot services within the boot to service OS destination may include callback GUID E476DA784 callback GUID A267BC90→callback GUID DC584F41→callback GUID DA4F4857→callback GUID BA018C57. In this example, the pre-authorized callback chain for exit boot services may be substantially similar for the boot to host OS destination, the boot to service OS destination, and the boot to diagnostics destination.

In certain examples, the boot to setup destination may include the same general pre-authorized callback chain but with slightly different callback GUIDs than the pre-authorized callback chains within the boot to host OS destination, the boot to service OS destination, and the boot to diagnostics destination. For example, the pre-authorized ready to boot callback chain within the boot to setup destination may include callback GUID 123ABC00→callback GUID 754A0BD0→callback GUID FAD543B12→callback GUID ABC00E749. Thus, he pre-authorized ready to boot callback chain in the boot to setup destination may include the same callback GUIDs as compared to the pre-authorized ready to boot callback chain in the boot to host OS destination. Additionally, the pre-authorized callback chain for exit boot services within the boot to setup destination may include callback GUID E476DA78→callback GUID A267BC90→callback GUID DC584F41. In this example, the pre-authorized callback chain for exit boot services in the boot to setup destination may be substantially similar to the boot to host OS destination except that the last two callback GUIDs DA4F4857 and BA018C57 have been removed. While only to pre-authorized callback chains for each destination have been described, each destination may include any suitable number of callback chains without varying from the scope of this disclosure.

During the BIOS runtime, each driver 322 may register a different callback to a different future event within the BIOS. In an example, these registered callbacks may be compiled as a callback chain for the BIOS. Before the callback chain is executed, processor 310 may verify the callback chain based on a pre-authorized callback chain associated with the particular BIOS being executed. A pre-authorized callback chain and a callback chain generated during BIOS runtime will be described with respect to FIGS. 4 and 5 below.

Figure 4:
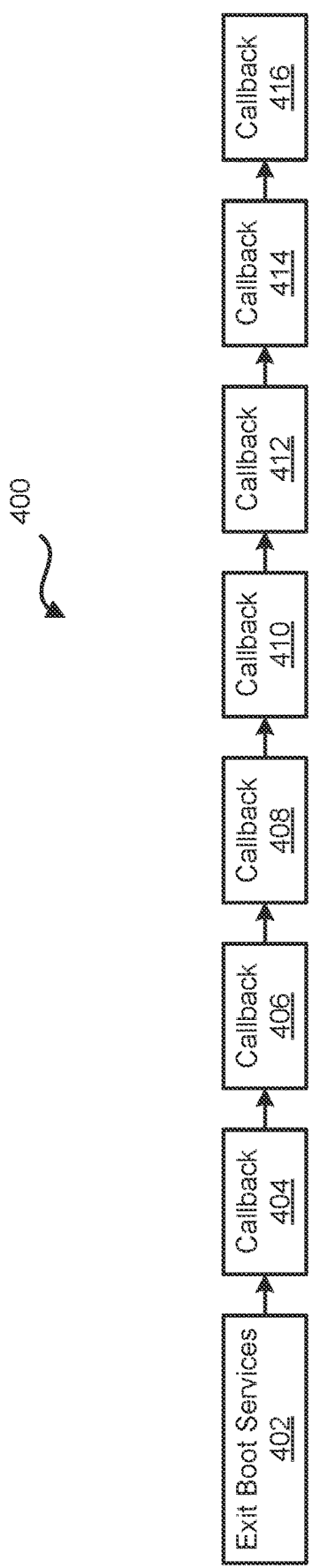
FIG. 4 is a block diagram of a pre-authorized callback chain according to at least one embodiment of the present disclosure.

FIG. 4 illustrates a pre-authorized callback chain 400 according to at least one embodiment of the present disclosure. Pre-authorized callback chain 400 may be a preauthorized callback chain for an exit boot services 402. In an example, exit boot services 402 may include any suitable number of callbacks. For example, exit boot services callback chain 402 includes callbacks 404, 406, 408, 410, 412, 414, and 416.

In certain examples, processor 310 may generate pre-authorized callback order 400 based on a fixed or static file or utilizing a POST build tool. In an example, processor 310 may track in order what driver 322 has registered what event on a driver by driver basis. For example, as shown in FIG. 4, the specific order for the callbacks includes callback 404, then callback 406, the callback 408, then callback 410, then callback 412, then callback 414, and finally callback 416. In response to pre-authorized callback chain 400 being created for exit boot services 402, processor 310 may stored the pre-authorized callback chain in an un-mutable storage space of a memory. In an example, processor 310 may utilize pre-authorized callback chain 400 to verify callback chain 500 of FIG. 5.

Figure 5:
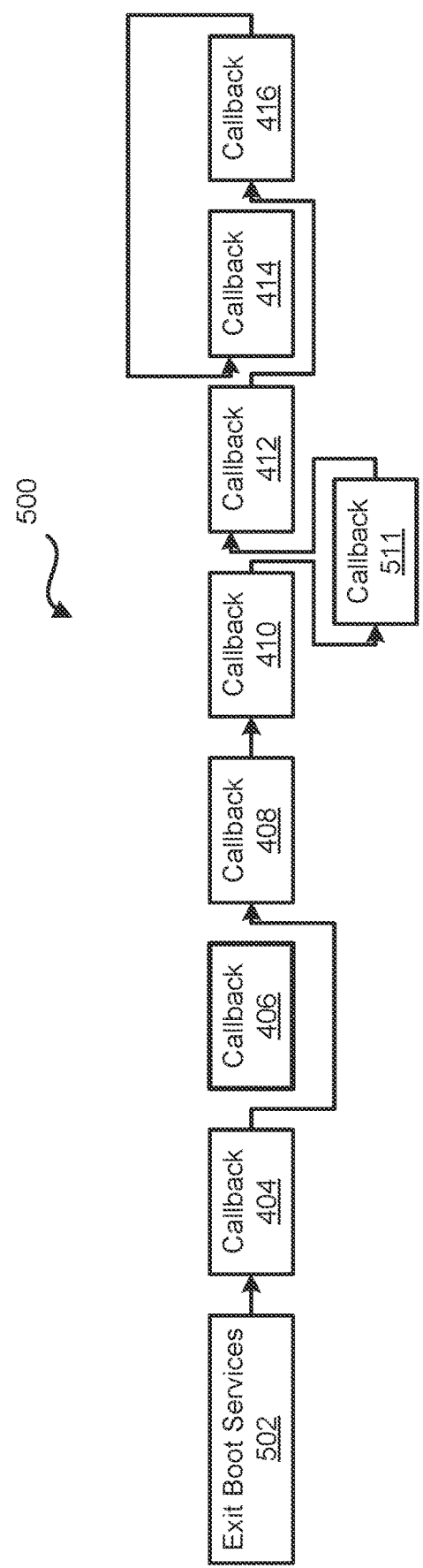
FIG. 5 is a block diagram of a tampered callback chain according to at least one embodiment of the present disclosure.

FIG. 5 illustrates a callback chain 500 according to at least one embodiment of the present disclosure. Callback chain 500 may be a callback chain for exit boot services 502 created during a BIOS runtime. In an example, exit boot services 502 may include any suitable number of callbacks. For example, callback chain 500 includes callbacks 404, 408, 410, 511, 412, 414, and 416.

As shown in FIG. 5, callback chain 500 includes some callback differences as compared to pre-authorized callback chain 400. For example, callback chain 500 skips callback 406, has and additional callback 511 in between callbacks 410 and 412, and has a different order with respect to callbacks 414 and 416. In an example, before callback chain 500 is executed, processor 310 may perform one or more suitable operations to verify the callback chain 500 based on the pre-authorized callback chain 400. For example, processor 310 may read pre-authorized callback chain from a memory within information handling system 300, and may verify the signature associated with the pre-authorized callback chain or order. In an example, the signature of pre-authorized callback order or chain may be verified in any suitable manner including, but not limited to, communicating with an HSM server to verify the signature. In response to the signature of pre-authorized callback order or chain being verified, processor 310 may compare callback order or chain 500 with pre-authorized callback order or chain 400. This comparison is performed to ensure that the runtime BIOS has proceeded through the expected code paths without any foreign or unexpected callbacks being injected within in the callback chain, tampering, or the like.

In an example, callback chain 500 may determined to be tampered with based on callback 406 be passed over, such that the callback chain includes callback 408 being executed immediately after callback 404. In this example, callback 406 may be a security check, may set properties of a non-volatile random access memory (NVRAM), or any other callback that is needed to verify a proper BIOS is being executed within information handling system 300. In an example, callback 406 may be a callback that may only be executed after a security check, such as callback 406, has been performed. Malicious code in the BIOS may skip callback 406 to prevent a security check from being performed during the execution callback chain 500, such that other code that may not pass the security check may be executed. In this example, the comparison of callback chain 500 with pre-authorized callback chain 400 may prevent malicious actors to skip or modify important security code. In an example, the malicious code may insert callback 511 into the callback chain 500, and callback 511 may be a malicious callback inserted within the BIOS. In this example, the comparison of callback chain 500 with pre-authorized callback chain 400 may prevent an unauthorized driver, which in turn may prevent malicious actors from being able register an unauthorized event callback.

In an example, the malicious code may also change the order that two or more callbacks are executed as compared to pre-authorized callback chain 400. For example, callback chain 500 may have callback 416 being performed immediately after callback 412, and then callback 414 being performed after callback 416. During the verification process, processor 310 may flag callback chain 500 for any or all of the changes in the callback chain as compared to pre-authorized chain 400. For example, if any foreign event callback GUIDs for a particular destination or event is added to the BIOS runtime registration process, if any expected event callback GUID is absent from the runtime registration, or the like, then processor 310 executing the BIOS may raise a threat flag to indicate that the BIOS has been tampered.

Referring back to FIG. 3, based on processor 310 determining that callback chain 500 has one or more vulnerabilities, the processor may perform one or more operations to perform a security policy to prevent the malicious code from being performed within information handling system 300. For example, processor 310 may launch a service OS, which may be executed to attempt to recover the BIOS image to a previous version before the attack was made. The security policy may also include processor 310 blocking the boot of the BIOS, or starting an on-the-box post-security-breach investigation. Processor 310 may also perform operations to quarantine information handling system 300, and flag the information for debugging and forensic analysis.

In an example, the security policy may enable processor 310 to perform additional operations to prevent the malicious callback chain from being executed. For example, in response to detecting a potential vulnerability in the generated callback chain, processor 310 may boot to a specific version of the OS. In certain examples, the specific version of the OS may provide limited access to particular hardware components and limited access to particular resources within information handling system 300. Based on the limited access, processor 310 may enable an administrator to access the BIOS code and other code within information handling system 300 so that the administrator may locate the source of the attack. In certain examples, the security policy may also enable processor 310 to load factory default configuration or other recovery operations.

In certain examples, processor 310 may automatically enforce or perform the operations described above, such as comparing a BIOS runtime callback chain to a pre-authorized callback event chain stored in an un-mutable storage location of a memory. In these examples, these operations may be performed even when the BIOS is compromised by a malicious attacker because the attacker does cannot access the um-mutable storage location to change the code and pre-authorized callback chain. Detection of BIOS level vulnerability may an important first step to safeguard and improve information handling system 300 and the complete enterprise information technology (IT) infrastructure. The operations described above may be a key incident of attack (IOA) event to be investigated and may help identify the vulnerable areas within information handling system 300. Information handling system 300 may include any suitable infrastructure provide the IOA event to a cloud server for POST breach investigation by an IT administrator.

Figure 6:
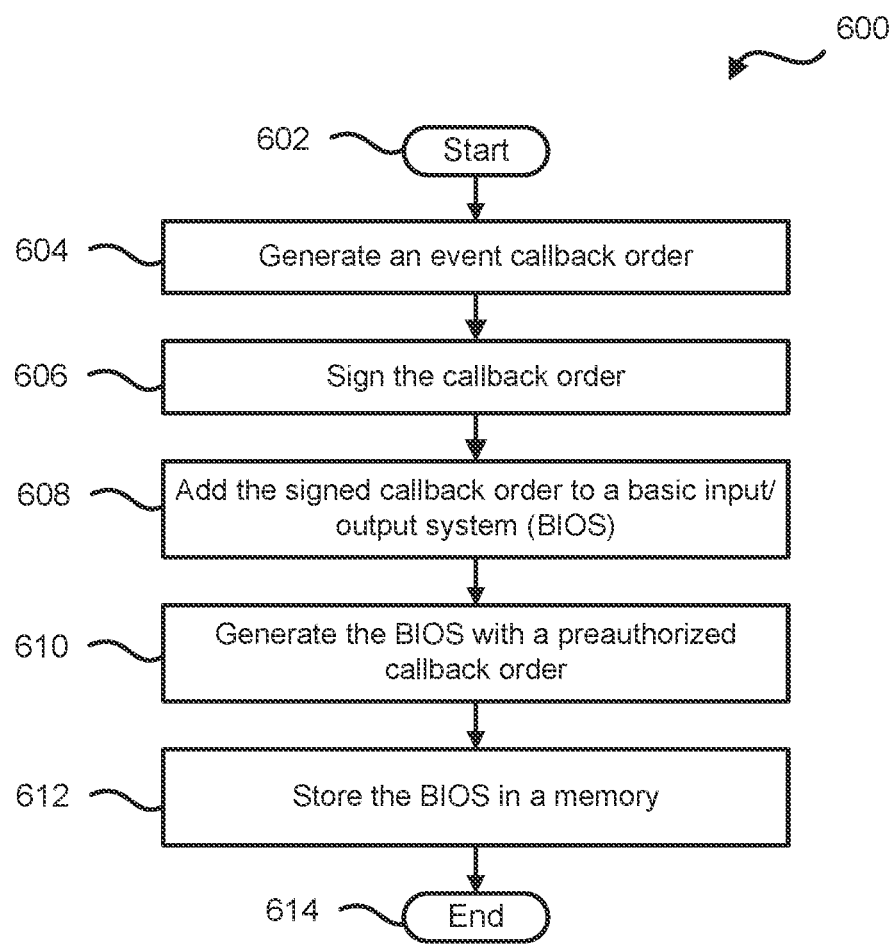
FIG. 6 is a flow diagram of a method for generating an authorized callback order for an information handling system according to at least one embodiment of the present disclosure.

FIG. 6 illustrates a flow diagram of a method 600 for generating an authorized callback order for an information handling system according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, processor 310 of FIG. 3, or any other type of controller, device, module, processor, or any combination thereof, operable to employ all, or portions of, the method of FIG. 6.

At block 604, an event callback order is generated. In certain examples, a processor executing a BIOS or other component may generate an event callback order in any suitable manner. For example, the processor may generate the event callback order based on a fixed or static file within an information handling system. In an example, when the callback order generated based on a static file, the processor may statically analyze complied code that includes multiple drivers and each driver may register a different event callback. In this situation, the processor may track in order what driver has registered what event on a driver by driver basis. In another example, the processor may generate the event callback order using a power on self-test POST build tool. If the event callback order is generated using a POST build tool, the processor may utilize the POST build tool to automatically build a callback chain based on a UEFI dependency expression and event objects. For example, the processor may execute the BIOS in a controlled or safe environment and the processor may observe the different drivers that run different callback events to create the callback chain. In certain examples, a particular model BIOS is used for a particular platform, such that each platform has its own BIOS and callback chain.

At block 606, the callback order may be signed. In an example, the callback order may be signed by any suitable component. For example, the callback order may be sent to HSM server, which in turn may sign the callback order for verification purposes during BIOS runtime. At block 608, the signed callback order may be added to the BIOS of the information handling system. In an example, the signed callback order may be defined as a pre-authorized callback order within the BIOS.

At block 610, BIOS is generated with the pre-authorized callback order as part of the BIOS. At block 612, the generated BIOS may be saved in a memory of the information handling system, and the flow ends at block 614. In an example, the BIOS may be flashed into the memory, or a BIOS already stored in the memory may be updated with the generated BIOS having the pre-authorized callback order. In certain examples, the pre-authorized callback chains within the BIOS may be securely provisioned to an un-mutable storage space within a SPI flash memory. In an example, this un-mutable storage space within the SPI flash memory may protect the integrity of the pre-authorized callback chains. In this situation, the pre-authorized callback chains may only be updated during a secure BIOS update process.

Figure 7:
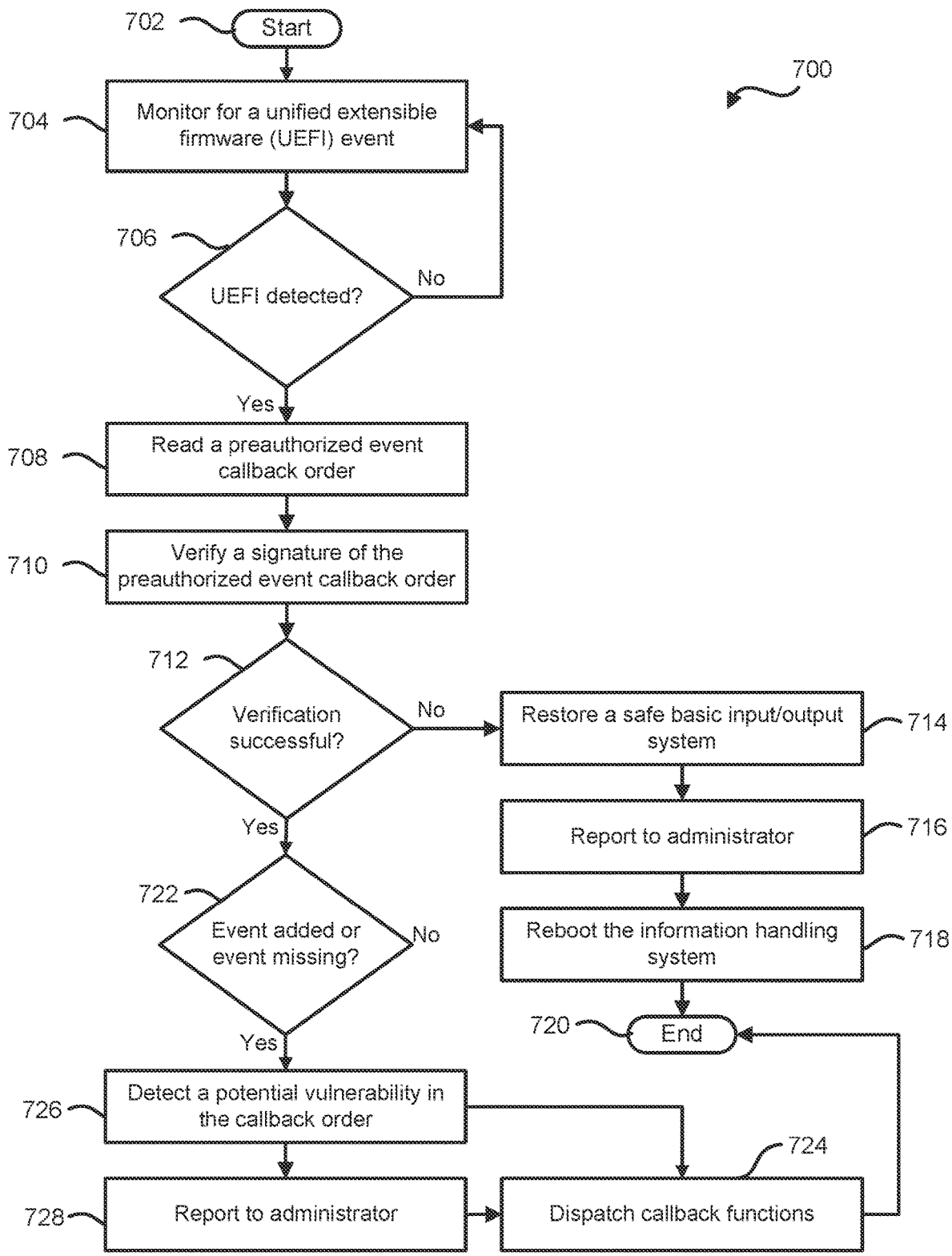
FIG. 7 is a flow diagram of a method for verifying a callback order during a boot operation of an information handling system according to at least one embodiment of the present disclosure.

FIG. 7 is a flow diagram of a method for verifying a callback order during a boot operation of an information handling system according to at least one embodiment of the present disclosure, starting at block 702. It will be readily appreciated that not every method step set forth in this flow diagram is always necessary, and that certain steps of the methods may be combined, performed simultaneously, in a different order, or perhaps omitted, without varying from the scope of the disclosure. FIG. 7 may be employed in whole, or in part, processor 310 of FIG. 3, or any other type of controller, device, module, processor, or any combination thereof, operable to employ all, or portions of, the method of FIG. 7. In an example, the operations described with respect to FIG. 7 may be performed during a BIOS runtime.

At block 704, detection of an UEFI event may be monitored. At block 706, a determination is made whether the UEFI event has been detected. In response to the UEFI event being detected, a pre-authorized event callback order is read at block 708. In an example, the pre-authorized event callback order may be one of multiple callback orders stored within an un-mutable storage location of a memory. The pre-authorized event callback order may be identified from the other pre-authorized callback chains based on the boot destination for the UEFI event and the generated callback chain created for the UEFI event during the BIOS runtime.

At block 710, a signature of the pre-authorized event callback order is verified. In an example, the signature may be verified in any suitable manner by any suitable device or component. For example, the signature may be compared to a signature stored within a HSM server in communication with the information handling system. At block 712, a determination is made whether the verification of the signature was successful. If the verification was successful, the flow continues as described below with respect to block 722. However, if the verification was not successful, a safe BIOS of the information handling system is restored at block 714. In an example, the safe BIOS may be restored based on a security policy of the information handling system. At block 716, the unsuccessful signature verification is reported or provided to an IT administrator of the information handling system. At block 718, the information handling system is rebooted, and the flow ends at block 720.

As stated above, if the signature is successfully verified, the flow continues at block 722 and a determination is made whether an event has been added or an event is missing within the callback order generated during the BIOS runtime. In an example, the determination may be made in any suitable manner. For example, the callback order generated during the BIOS runtime may be compared to the verified pre-authorized callback order. During the comparison, any missing callback GUIDs, any added callback GUIDs, any order changes among the callback GUIDs, or the like may indicate a problem with the callback order generated during the BIOS runtime.

If no callback GUIDs are missing or no callback GUIDs are added, the callback functions are dispatched at block 724, and the flow ends at block 720. In an example, the callback functions may be dispatched for execution in the same order as in the callback order generated during the BIOS runtime. If callback GUIDs are missing or callback GUIDs are added, a potential vulnerability is detected at block 726. At block 728, the potential vulnerability of the callback order generated during the BIOS runtime is reported or provided to the IT administrator for the information handling system. At block 724, based on the potential vulnerability, callback functions may be dispatched for execution in the same order as in the pre-authorized callback order, and the flow ends at block 720.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory to store a basic input/output system (BIOS); and
a processor to communicate with the memory, the processor to:
monitor the BIOS for a unified extensible firmware interface (UEFI) event;
in response to a detection of the UEFI event, read a preauthorized event callback order;
compare a callback order for the UEFI event with the preauthorized event callback order;
based on the callback order for the UEFI event not matching the preauthorized event callback order, detect a potential vulnerability in the UEFI event; and
in response to the detected potential vulnerability in the UEFI event, dispatch one or more callback functions for execution in a same order as the preauthorized event callback order.

2. The information handling system of claim 1, prior to the comparison of the callback order for the UEFI event with the preauthorized event callback order, the processor further to:
perform a verification process for a signature of the preauthorized event callback order;
in response to a failure of the verification process, store a safe BIOS in the memory; and
in response to a success of the verification process, compare of the callback order for the UEFI event with the preauthorized event callback order.

3. The information handling system of claim 1, wherein based on the callback order for the UEFI event matching the preauthorized event callback order, the processor further to dispatch one or more callback functions from the callback order for the UEFI event.

4. The information handling system of claim 1, prior to the monitoring for the UEFI event, the processor further to:
generate a callback order;
sign the generated callback order;
add the signed generated callback order as the preauthorized event callback order in a BIOS of the information handling system;
generate the BIOS with the preauthorized event callback order; and
store the generated BIOS in a memory of the information handling system.

5. The information handling system of claim 4, wherein the processor generates the BIOS callback order based on a fixed file in the information handling system.

6. The information handling system of claim 4, wherein the processor utilizes a power on self-test (POST) build tool to generate the BIOS callback order.

7. The information handling system of claim 4, wherein the processor further to:
provide the generated callback order to a hardware security module server.

8. The information handling system of claim 7, wherein the processor further to:
receive the signed generated callback order from the hardware security module server.

9. A method comprising:
monitoring, by a processor of an information handling system, for a unified extensible firmware interface (UEFI) event;
in response to a detection of the UEFI event, reading a preauthorized event callback order;
comparing a callback order for the UEFI event with the preauthorized event callback order;
based on the callback order for the UEFI event not matching the preauthorized event callback order, detecting a potential vulnerability in the UEFI event; and
in response to the detected potential vulnerability in the UEFI event, dispatching, by the processor, callback functions for execution in a same order as the preauthorized event callback order.

10. The method of claim 9, wherein prior to the comparing of the callback order for the UEFI event with the preauthorized event callback order, the method further comprises:
performing a verification process for a signature of the preauthorized event callback order;
in response to a failure of the verification process, storing a safe basic input/output system (BIOS) of the information handling system; and
in response to a success of the verification process, comparing of the callback order for the UEFI event with the preauthorized event callback order.

11. The method of claim 9, further comprising:
based on the callback order for the UEFI event matching the preauthorized event callback order, dispatching one or more callback functions from the callback order for the UEFI event.

12. The method of claim 9, wherein prior to the monitoring for the UEFI event, the method further comprises:
generating a basic input output system (BIOS) callback order;
signing the generated BIOS callback order;
adding the signed generated BIOS callback order as the preauthorized event callback order in a BIOS of the information handling system;
generating the BIOS with the preauthorized event callback order; and
storing the generated BIOS callback order in a memory of the information handling system.

13. The method of claim 12, wherein the generating of the BIOS callback order is based on a fixed file in the information handling system.

14. The method of claim 12, wherein the generating of the BIOS callback order includes:
utilizing a power on self-test (POST) build tool.

15. The method of claim 12, wherein the signing of the generated BIOS callback order is performed by a hardware security module server.

16. An information handling system comprising:
a memory to store a basic input/output system (BIOS); and
a processor to:
monitor the BIOS for a unified extensible firmware interface (UEFI) event;
in response to a detection of the UEFI event, read a preauthorized event callback order;
perform a verification process for a signature of the preauthorized event callback order;
in response to a failure of the verification process, store a safe BIOS in the memory;

in response to a success of the verification process, compare a callback order for the UEFI event with the preauthorized event callback order;

compare the callback order for the UEFI event with the preauthorized event callback order;

if the callback order for the UEFI event matches the preauthorized event callback order, then dispatch one or more callback functions from the callback order for the UEFI event;

if the callback order for the UEFI event does not match the preauthorized event callback order, then detect a potential vulnerability in the UEFI event; and in response to the detected potential vulnerability in the UEFI event, dispatch one or more callback functions for execution in a same order as the preauthorized event callback order.

17. The information handling system of claim 16, prior to the monitoring for the UEFI event, the processor further to:
generate the callback order;
sign the generated callback order;
add the signed generated callback order as the preauthorized event callback order in a BIOS of the information handling system;
generate the BIOS with the preauthorized event callback order; and
store the generated BIOS in a memory of the information handling system.

18. The information handling system of claim 17, wherein the processor generates the BIOS callback order based on a fixed file in the information handling system.

19. The information handling system of claim 17, wherein the processor utilizes a power on self-test (POST) build tool to generate the BIOS callback order.

20. The information handling system of claim 17, wherein the processor further to:
provide the generated callback order to a hardware security module server; and
receive the signed generated callback order from the hardware security module server.

* * * * *